United States Patent [19]

Hanada

[11] Patent Number: 4,864,533

[45] Date of Patent: Sep. 5, 1989

[54] DATA TRANSFER CONTROL UNIT PERMITTING DATA ACCESS TO MEMORY PRIOR TO COMPLETION OF DATA TRANSFER

[75] Inventor: Masayuki Hanada, Kanagawa, Japan

[73] Assignee: Kabushiki Kaisha Toshiba, Kawasaki, Japan

[21] Appl. No.: 913,762

[22] Filed: Sep. 30, 1986

[30] Foreign Application Priority Data

Sep. 30, 1985 [JP] Japan ................................. 60-217112

[51] Int. Cl.⁴ ...................... G06F 13/14; G06F 13/20; G06F 13/28; G06F 13/32

[52] U.S. Cl. ................... 364/900; 364/950.2; 364/957; 364/963; 364/963.2

[58] Field of Search ............... 364/300, 200 MS File, 364/900 MS File

[56] References Cited

U.S. PATENT DOCUMENTS

| | | | |
|---|---|---|---|
| 4,371,932 | 2/1983 | Dinwiddie, Jr. et al. | 364/200 |
| 4,417,304 | 11/1983 | Dinwiddie, Jr. | 364/200 |
| 4,479,179 | 10/1984 | Dinwiddie, Jr. | 364/200 |
| 4,490,784 | 12/1984 | Ives et al. | 364/200 |
| 4,504,902 | 3/1985 | Gallaher et al. | 364/200 |
| 4,534,013 | 8/1985 | Sheth | 364/900 |
| 4,575,814 | 3/1986 | Brooks, Jr. et al. | 364/900 |
| 4,607,348 | 8/1986 | Sheth | 364/900 |
| 4,613,954 | 9/1986 | Sheth | 364/900 |
| 4,658,349 | 4/1987 | Tabata et al. | 364/200 |
| 4,670,836 | 6/1987 | Kubo et al. | 364/200 |
| 4,737,908 | 4/1988 | Shinohara et al. | 364/200 |

Primary Examiner—Archie E. Williams, Jr.
Assistant Examiner—Robert F. B. Harrell
Attorney, Agent, or Firm—Foley & Lardner, Schwartz, Jeffery, Schwaab, Mack, Blumenthal & Evans

[57] ABSTRACT

A data transfer control unit comprises a first address register, a second address register and a control circuit. The first address register stores a first final address value of a memory area of a memory into which data is to be transferred. The second address register stores a second final address value of data which has already been transferred to the memory area of the memory. The control circuit compares the first final address value and a second final address value with an address value of data access by a CPU in order to generate a memory indication signal indicative of whether the address value of data accessed by the CPU belongs to the addresses of the data which has already been stored or has not yet been stored. The control circuit further prohibits a data transfer from the memory area to the CPU only when the address value of the data accessed by the CPU belongs to the addresses of the data which have not yet been stored in the memory.

10 Claims, 3 Drawing Sheets

DATA TRANSFER CONTROL UNIT PERMITTING DATA ACCESS TO MEMORY PRIOR TO COMPLETION OF DATA TRANSFER

BACKGROUND OF THE INVENTION

1. Field of the Invention

The present invention relates to a data transfer control unit in a computer system wherein access to data, which has already been transferred, by a CPU is possible even when all of the data has not yet been transferred without waiting for the completion of all of the data transfer.

2. Description of the Prior Art

In a computer, data transfer between an input/output unit and memory, e.g. a main memory unit, or data transfer between memory units (e.g. between a main memory unit and a cache memory), is performed by the CPU, through designation of memory areas for use in normal data transfers and for use in the aforementioned types of data transfer, with the data transfer taking place through the CPU. In this case, the CPU functions are required to implement data transfer processing, so that the CPU is unavailable for any other processing until data transfer has been completed.

With recent models of computers, a method of data transfer referred to as direct memory access (generally referred to as DMA) is becoming increasingly employed. With DMA operation, a data transfer controller executes direct transfer of data into or out of memory, without the intervention of the CPU. By utilizing a data transfer controller in this way, data can be transferred at high speed, while the CPU is made available for other processing during the process of data transfer. Thus, a DMA operation has the advantage of providing more efficient usage of the CPU.

On the other hand, when the CPU must access data which has been designated for transfer, such access cannot be executed until transfer of all data has been completed. According to the prior art, a determination as to whether or not the data required by the CPU has been transferred is carried out by software, which checks whether the transfer of all data has been completed. Furthermore, data is generally transferred in units of blocks, so that when a large amount of data is transferred it becomes necessary for the CPU to wait for a substantial time before accessing the data which it requires. This results in a low effeciency of utilization of the CPU.

SUMMARY OF THE INVENTION

It is an object of the present invention to provide a data transfer control unit which enables a CPU to access required data in a memory area into which data has already been transferred before all of the data has been completely transferred, in the course of the data transfer by the control unit.

It is another object of the present invention to provide a data transfer control unit in which a CPU is enabled to access the data which has partly been transferred to a memory area, without the need to wait for completion of transfer of all of the data.

It is still another object of the present invention to provide a data transfer control unit in which the efficiency of processing by a CPU can be increased by a quick access to required data.

It is yet another object of the present invention to provide a data transfer control unit in which the decision as to whether or not the CPU will be enabled to access required data, from among all of the data that is to be transferred, is made in accordance with whether or not the address of the data to be accessed by the CPU lies between the final address value of a memory area into which the data is to be transferred and the current address value of the data which has transferred.

It is yet still another object of the present invention to provide a data transfer control unit in which the time required for a CPU to wait for access to data is reduced because there is no need to wait for completion of transfer of all of the data during the data transfer.

One feature of the present invention resides in a data transfer control unit which comprises: first address register means for registering a leading address value of a memory area of a memory to which data to be transferred from an unit is stored; second address register means for registering a final address value of the memory area of the memory into which the data to be transferred is stored; third address register means for registering a current address value of data which has already been transferred to the memory area, counting up one by one; and determination means for determining whether an address value of data accessed by a CPU in the course of the data transfer belongs to the addresses of the memory area of the memory into which the data to be transferred has already been stored or has not yet been stored.

Another feature of the present invention resides in a data transfer control system having at least the two data transfer control units, connected in parallel to each other wherein the output of the determination means is connected to each of control units therein respectively so as to supply a signal indicating if an address of data in question accessed by one control unit to the other control unit belongs to the addresses of the memory areas into which the data to be transferred has not yet been stored.

These and other objects, features and advantages of the invention will be better understood from the following description with reference to the accompanying drawings.

DESCRIPTION OF THE PREFERRED EMBODIMENTS

Figure 1:
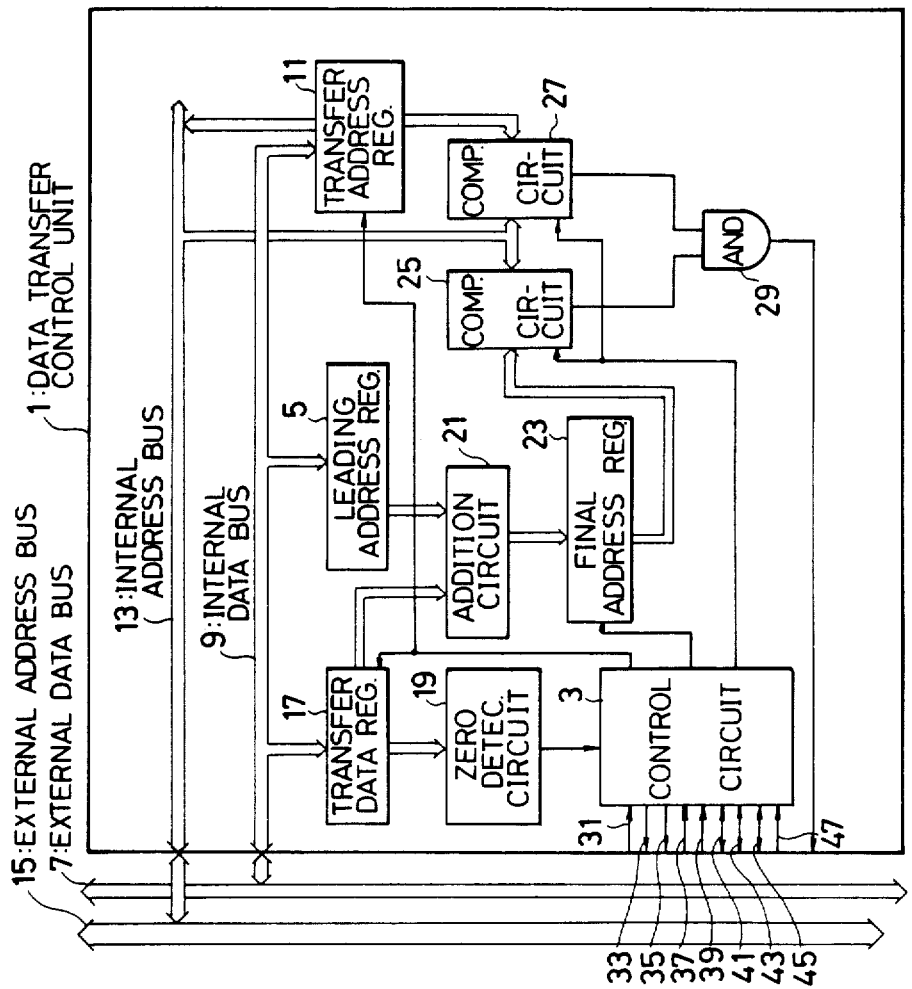
FIG. 1 illustrates a block diagram of the data transfer control unit according to one embodiment of the present invention.

Embodiments of the present invention will now be described, referring to the drawings.

Referring to FIG. 1, there is shown a first embodiment of a data transfer control unit 1 according to the present invention. The data transfer control unit 1 executes control of transfer of data, for example between an I/O unit (not shown in the drawing) and a memory unit (not shown in the drawing), under the control of a CPU (not shown in the drawing), without data being transferred through the CPU itself. In the following, it will be assumed for the purposes of explanation that data transfer is performed between an I/O unit and a memory unit. The data transfer control unit 1 includes a control circuit 3 which performs input and output of signals, over various signal lines between registers and circuits (described hereinafter), the I/O unit and the memory unit, and a leading address register 5, which stores an address value representing the leading address of the memory area into which data is to be transferred after being read out from the I/O unit. This leading address value is set in the leading address register by the CPU, by transfer through an external data bus 7 and an internal data bus 9. In a transfer address register 11, the same leading address value as that set in the leading address register 5 is set by the CPU, by transfer over the external data bus 7 and internal data bus 9 when transfer of data from the I/O unit to the memory unit is initiated. This address value is output from transfer address register 11 to the memory unit over an internal address bus 13 and an external address bus 15. When a data unit has been transferred from the I/O unit to the memory unit and has been written into the memory, i.e. upon completion of each data write operation, the memory unit sends a signal indicating the completion of the write operation, through a signal lead 47, to the control circuit 3. This signal is applied by control circuit 3 to the transfer address register 11, and in response, the transfer address register 11 increments by one the address count held therein.

A transfer data register 17 holds a count value representing the number of data units that remain to be transferred to the memory unit. The initial value of this number is supplied from the CPU, over the external data bus 7 and internal data bus 9, to be set into the transfer data register 17. Each time a data unit is transferred, the transfer data count held in transfer data register 17 is decremented by one, by the same signal which acts to increment the transfer address register 11. A zero detection circuit 19 serves to judge whether or not transfer of all data has been completed. Specifically, the data unit count value held in the transfer data register 17 is successively reduced as data transfer progresses, and when this count value reaches zero this is detected by the zero detection circuit 19. When this occurs, the zero detection circuit 19 outputs a signal to control circuit 3, whereby the CPU is notified of the completion of data transfer.

An addition circuit is adapted to add together the leading address value held in the leading address register 5 and the transfer data unit count which is held in the transfer data register 17. The result of this addition, which represent the final address value of the memory area into which the data is to be transferred, is set into a final address register 23.

Reference numerals 25 and 27 respectively denote comparator circuits. When the CPU has been granted the right to utilize the external data bus 7, and requires to access data from the memory unit, memory read/write control signals and bus utilization control signals are applied to control circuit 3 over memory control signal lines 43 and 45. In response to these control signals, control circuit 3 applies activation signals to the comparator circuits 25 and 27. Comparator circuit 25 serves to compare the final address value, held in the final address register 23, with the address value of the data which the CPU requires to access. If this final address value is equal to or greater than the address of the data required by the CPU, then an output signal is produced from comparator circuit 25 and is input to AND gate 29. Similarly, comparator circuit 27 compares the current address value held in the transfer address register 11 (i.e. the address of the data which has been most recently transferred) with the address value of the data which the CPU requires to access. If the address value of the data to be accessed by the CPU is equal to or greater than the current address of the most recently transferred data, then an output signal is applied from comparator 27 to be input to AND gate 29. Thus, if the address value of the data to be accessed by the CPU is smaller than the final address value, and is greater than the address value of the data most recently transferred, then this indicates that the data to be accessed by the CPU has not yet been completely transferred to the memory unit. In this case, AND gate 29 responds to the output signals from comparator circuits 25 and 27 by notifying the CPU that the data which the CPU requires to access has not yet been transferred to the memory unit.

The operation of the embodiment of a data transfer control unit according to the present invention having the configuration described above is as follows. Firstly, in preparation for transfer to the memory unit of data which is read out from the I/O unit, the CPU sets the leading address value (i.e. the area within the memory unit into which data is to be transferred) in the leading address register 5 and transfer address register 11 of data transfer control unit 1 through external data bus 7 and internal data bus 9. In addition, the CPU sets a count value, representing the number of data units which are to be transferred, into the, transfer data register 17. The CPU also inputs command signal to the I/O unit, for controlling the read-out of data. With the leading address value set in the leading address register 5 in this way, and the number of data units to be transferred being set in transfer data register 17, the leading address value and the count value representing the number of data units to be transferred are added together in addition circuit 21. On completion of this addition processing, the resultant sum value (i.e. the final address value) is set in the final address register 23.

Next, when the I/O unit is ready to perform read-out of data, a data transfer request signal is supplied over data transfer request signal line 31 to control circuit 3, which responds by requesting the CPU for the right to utilize the address and data buses. This request is sent over bus utilization request signal line 35. When it becomes possible for the CPU to release the address and data buses, it relinquishes control of these buses and designates that control circuit 3 has been granted the right to utilize the address and data buses, by sending a signal over the bus utilization right permission line 37. The control circuit 3 then notifies the I/O unit that data transfer by the I/O unit is now possible, with this notification being performed by a signal sent to the I/O unit over the data transfer permission signal line 33.

Next, the address value which has been set in the transfer address register 11 is sent over internal address bus 13 and external address bus 15 to the memory unit, while in addition the control circuit 3 applies write control signals to the memory unit over signal line 43, whereby write-in of data to the memory unit is executed. When a read-out control signal is then applied over signal line 41 to the I/O unit, from control circuit 3, the transfer data is sent from the I/O unit, over the external data bus 7 to be written into the memory unit. As successive units of transferred data are successively written into the memory unit, the address value held in transfer address register 11 is incremented by control circuit 3, while in addition the count of the number of data units to be transferred (held in the transfer data register 17) is correspondingly decremented. In this way, as data units are successively transferred from the I/O unit to the memory unit, and when the count of the number of data units to be transferred (held in the transfer data register 17) reaches zero, this is detected by the zero detection circuit 19, which then notifies the control circuit 3 that the transfer of all data has been completed. Data transfer operations are then terminated.

Thus, while transfer of data from the I/O unit to the memory unit 1 under the control of the data transfer control unit is in progress, then when the CPU attempts to access the memory unit for requisite data, the data transfer control unit 1 judges whether or not the data required by the CPU has already been transferred to the memory unit. More specifically, the address value of data which has been most recently transferred from the I/O unit to the memory unit (immediately prior to the request being issued by the CPU for access to the memory unit), i.e. the address value which is currently held in the transfer address register 11, is compared with the address value of the data required to be accessed by the CPU, with this comparison being performed by comparator circuit 25. In addition, the final address value which is held in final address register 23 is compared with the address value of the data to be accessed by the CPU, with this comparison being performed by comparator circuit 27. If the address of the data to be accessed by the CPU is equal to or smaller than the final address value, and is equal to or greater than the address value held in the transfer address register, then AND gate 29 responds to the resultant output signals from comparator circuits 25 and 27 by applying a memory indication signal to the CPU which notifies the CPU that the requisite data has not yet been transferred to the memory unit. Data transfer is then resumed. If on the other hand the address value of the data to be accessed by the CPU is smaller than the address value held in the transfer address register 11, then the CPU is notified that the requisite data has already been transferred to the memory unit. This data is then transferred from the memory unit to the CPU.

In the embodiment described above, the leading address which is held in the leading address register 5 is added to the number of data units to be transferred (held in the transfer data register 17), with this addition being performed by addition circuit 21. The final address is set in the final address register 23. However it would be equally possible to transfer the final address value directly from the CPU to the final address register 23. This would enable simplification of the configuration of the data transfer control unit 1.

Furthermore, in the embodiment described above, the final address value is obtained by adding the leading address value to the number of data units to be transferred. However it would be equally possible to input the final address value to the final address register 23 beforehand, and to subtract the leading address value from this final address value to thereby obtain the number of data units to be transferred.

Figure 2:
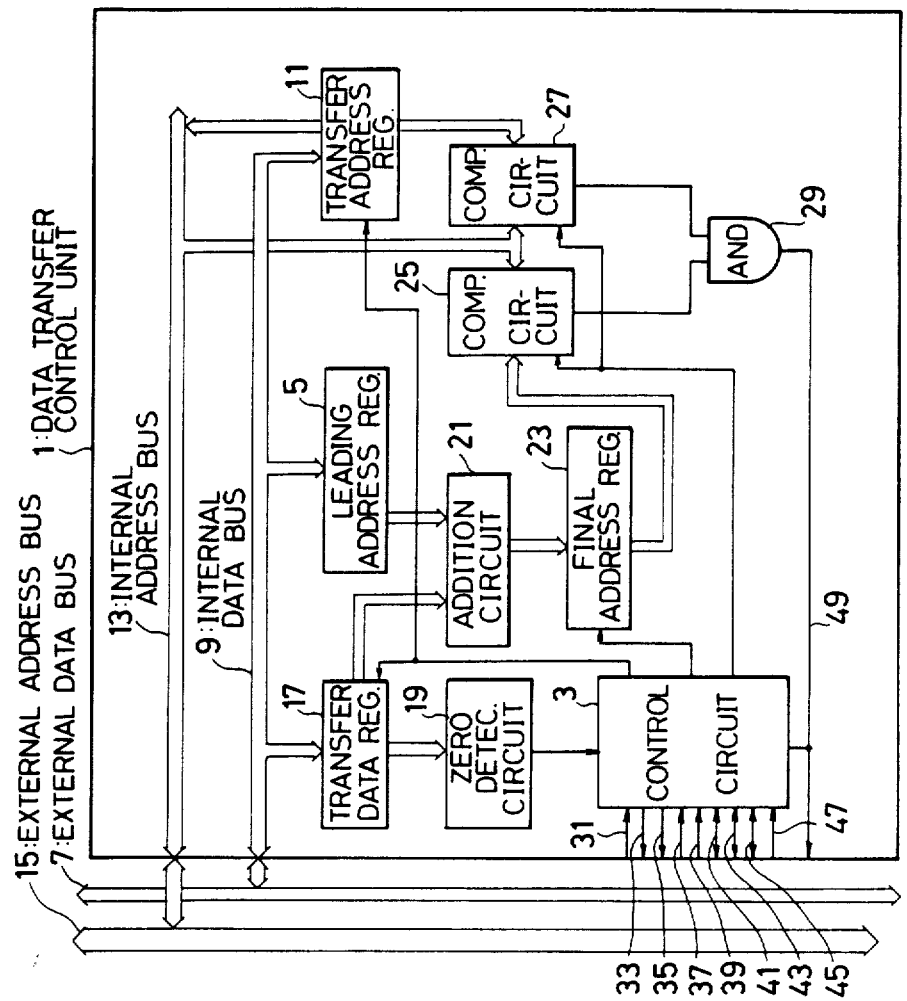
FIG. 2 illustrates a block diagram of a second embodiment of the data transfer control unit according to the present invention.

FIG. 2 is a block diagram of a second embodiment of a data transfer controller according to the present invention. With this embodiment, a plurality of data transfer control units each having the configuration shown in FIG. 2 are connected as shown in FIG. 3, whereby data transfer can be efficiently performed at high speed.

The data transfer controller of FIG. 2 differs from that of FIG. 1 in that an output signal is input to the control circuit 3, from the AND gate 29 of another data transfer controller, to indicate that access by the CPU under the control of that other data transfer control unit is directed towards a memory area into which requisite data has not yet been transferred. With this arrangement, it is necessary for AND gate 29 to be of wired-OR type, or to have a tri-state configuration.

Figure 3:
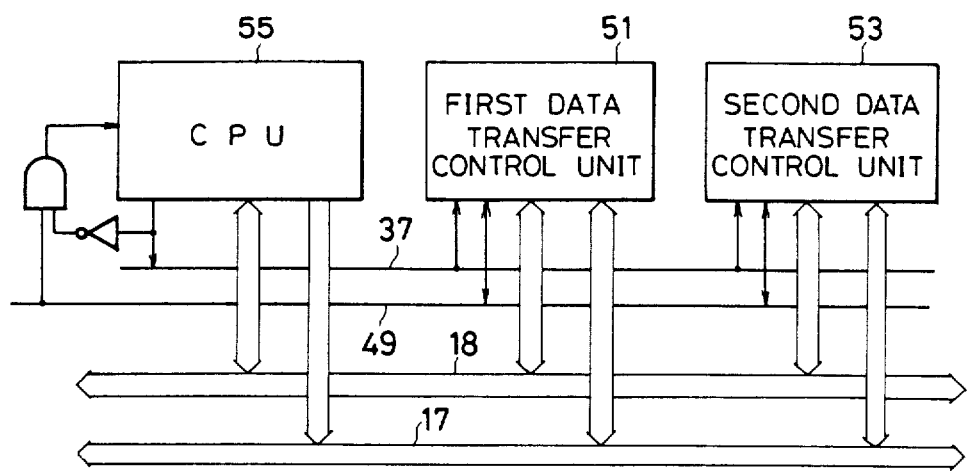
FIG. 3 illustrates a computer system having the data transfer control units connected in parallel to each other and to a CPU.

As shown in FIG. 3, a data transfer system is constructed in such a manner that a first data transfer controller 51 and a second data transfer control unit 53 are connected in parallel to a CPU 55. Thus, for example when the first data transfer controller 51 is executing transfer of data to a specific memory area, then if the second data transfer control unit 53 requests access to data that has not yet been transferred to the memory unit, first data transfer control unit 51 generates a signal indicating that the access by the second data transfer controller belongs to the memory area into which data has not yet been transferred. This signal is applied over signal line 49 to the control circuit of the second data transfer controller 53. Upon receiving this signal, the second data transfer controller 53 interrupts data access to the memory areas and halts decrementing of the transfer data register and incrementing of the transfer address register. After a fixed time interval has elapsed, access operation is resumed.

As described in the foregoing embodiments, the data transfer control unit according to the present invention enables a CPU to access requisite data, following transfer of that data, before all of the data that has been designated by the CPU for transfer has actually been completely transferred. In this way, enhanced CPU processing efficiency can be attained.

With the present invention, the decision as to whether or not the CPU will be enabled to access requisite data, from among all of the data that is to be transferred, is made in accordance with whether or not the address of the data to be accessed by the CPU lies between the final address value of the memory area into which the data is to be transferred and the current address value of the data which has already been transferred. If the data which the CPU requires to access has already been transferred, then the CPU is enabled to access that data, without the need to wait for completion of transfer of all of the data. As a result, the CPU can access required data at high speed, while in addition the time required for the CPU to wait for access to data is reduced, thereby increasing the efficiency of processing by the CPU.

While the invention has been described in its preferred embodiments, it is to be understood that the words which have been used are words of description rather than limitation and that various changes and modifications may be made within the purview of the appended claims without departing from the true scope and spirit of the invention in its broader aspects.

What is claimed is:

1. A data transfer control unit comprising:
   (a) first address register means for registering a first final address value of a memory area of a memory into which data are transferred;
   (b) second address register means for registering a second final address value for data which has already been transferred to the memory area of the memory; and (c) control means for comparing the first final address value of the memory area and the second final address value of data required by said first and second address register means with an address value of data accessed by a CPU to generate a memory indication signal indicative of whether the address value of data accessed by the CPU belongs to an address range of the data which has already been stored or has not yet been stored, and for prohibiting a data transfer from the memory area to the CPU only when the address value of the data accessed by the CPU belongs to an address range of the data which has not yet been stored, wherein, said first address register means comprises a leading address register for registering a leading address value of the memory area, a transfer data register for registering a number of the data to be transferred to the memory area, an addition circuit for adding the leading address value of the memory area and the number of the data to be transferred to obtain the first final address value of the memory area, and a final address register for registering the first final address value of the memory area.

2. The data transfer control unit as recited in claim 1 wherein said control means generates an unavailability signal when the address value of data accessed by the CPU belongs to an address range of the data which has not yet been stored.

3. The data transfer control unit as recited in claim 1 wherein said control means comprises:
a first comparator for comparing the address value of data accessed by the CPU with the first final address value stored in said first register means for producing a first output signal,
a second comparator for comparing the address value of data accessed by the CPU with the second final address value stored in the second register means for providing a second output signal, and
a logic circuit means for receiving said first and second output signal and for generating said memory indication signal.

4. The data transfer control unit as recited in claim 1 wherein said first comparator generates said first output signal when the address value of said data accessed by the CPU is equal to or less than the first final address value, and said second comparator generates said second output signal when the address value of data accessed by the CPU is equal to or larger than the second final address value.

5. The data transfer control unit as recited in claim 4 wherein said logic circuit means comprises an AND gate.

6. The data transfer control unit as recited in claim 1 further comprising a zero detection circuit means for detecting a zero state of said transfer data register.

7. The data transfer control unit as recited in claim 1 further including means for incrementing the second final address value stored in said second address register upon completion of transfer of a block of data.

8. The data transfer control unit as recited in claim 1 further including means for decrementing a value stored in said transfer data register upon completion of a transfer of a block of data.

9. A data transfer control system comprising:
(1) a first data transfer control unit including:
(a) first address register means for registering a first final address value of a memory area of a memory into which data are transferred;
(b) second address register means for registering a second final address value of data which has already been transferred to the memory area of the memory; and
(c) control means for comparing the first final address value of the memory area and the second final address value of data registered by said first and second address register means with an address value of data accessed by a CPU to generate a first memory indication signal indicative of whether the address value of data accessed by the CPU belongs to an address range of the data which has already been stored or has not yet been stored, and for prohibiting a data transfer from the memory area to the CPU only when the address value of the data accessed by the CPU belongs to an address range of the data which has not yet been stored;
(2) a second data transfer control unit including:
(d) a third address register means for registering a third final address value of a memory area of said memory into which data are transferred;
(e) fourth address register means for registering a fourth final address value of data which has already been transferred to the memory area of the memory;
(f) control means for comparing said third final address value of the memory area and the fourth final address value of data registered by said third and fourth address register means with an address value of data accessed by the CPU to generate a second memory indication signal indicative of whether the address value of data accessed by the CPU belongs to an address range of the data which has already been stored or has not yet been stored, and for prohibiting a data transfer from the memory area to the CPU only when the address value of the data accessed by the CPU belongs to an address range of the data which has not yet been stored; and
(3) means for connecting said first and second data transfer control units and said CPU in parallel with one another such that said first memory indication signal is fed to said CPU and said second data transfer control unit for preventing said second data transfer control unit from accessing data which has not yet been transferred to said memory.

10. A data transfer control unit comprising:
(a) first address register means for registering a first final address value of a storage area into which data are transferred;
(b) second address register means for registering a second final address value of data which has already been transferred to the storage area; and
(c) control means for comparing the first final address value of the storage area and the second final address value of data registered by said first and second address register means with an address value of data accessed by a CPU to generate a indication signal indicative of whether the address value of data accessed by the CPU belongs to the addresses of the data which has already been loaded to the storage area or has not yet been loaded, and for prohibiting a data transfer from the storage area to the CPU only when the address value of the data accessed by the CPU belongs to addresses of the data which has not yet been loaded, wherein said first address register means comprises a leading address register for registering a leading address value of the storage area, a transfer data register for registering a number of the data to be transferred to the storage area, an addition circuit for adding the leading address value of the storage area and the number of the data to be transferred to obtain the first final address value of the storage area, and a final address register for registering the first final address value of the storage area.

* * * * *